DIGITALLY EXPANDING DECODER FOR PULSE CODE MODULATION SYSTEMS

Filed Oct. 8, 1965 4 Sheets-Sheet 1

Inventors
ALEC H. REEVES
RYSZARD KITAJEWSKI
By [signature]
Attorney

DIGITALLY EXPANDING DECODER FOR PULSE CODE MODULATION SYSTEMS

Filed Oct. 8, 1965 4 Sheets-Sheet 2

Inventors
ALEC H. REEVES
RYSZARD KITAJEWSKI
By [signature]
Attorney

Sept. 30, 1969 A. H. REEVES ET AL 3,470,387

DIGITALLY EXPANDING DECODER FOR PULSE CODE MODULATION SYSTEMS

Filed Oct. 8, 1965 4 Sheets-Sheet 3

Inventors
ALEC H. REEVES
RYSZARD KITAJEWSKI
By Percy P. Lantzy
Attorney

DIGITALLY EXPANDING DECODER FOR PULSE CODE MODULATION SYSTEMS

Filed Oct. 8, 1965 4 Sheets-Sheet 4

Inventors
ALEC H. REEVES
RYSZARD KITAJEWSKI
By Percy P. Lantzy
Attorney

1

3,470,387

DIGITALLY EXPANDING DECODER FOR PULSE CODE MODULATION SYSTEMS

Alec Harley Reeves and Ryszard Kitajewski, Aldwych, London, England, assignors to International Standard Electric Corporation, New York, N.Y., a corporation of Delaware Filed Oct. 8, 1965, Ser. No. 494,008
Claims priority, application Great Britain, Feb. 5, 1965, 5,095/65
Int. Cl. H03k 5/20
U.S. Cl. 307—231 3 Claims

ABSTRACT OF THE DISCLOSURE

This is a decoder that operates on a 6-digit binary code generated in the transmitter from a 10-digit binary code comprising two portions, one portion including 3-digits indicating the position of the first "1" in the 10-digit code and the other portion including the 3-digits immediately following the first "1" in the 10-digit code. The decoder includes a source of pre-pulse which initiates the operation of a damped tuned circuit and a damped bias voltage source and charges an integrating condenser to a given value. The digits of the other portion are converted to weighted amplitude pulses in the tuned circuit and add their value to the condenser. The digits of the one portion, through the cooperation of the voltage source, are converted to weighted width modulated pulses which close a switch to discharge the condenser at a higher than normal rate. The final voltage on the condenser is the PAM signal which is extracted by a suitably enabled gate.

This invention relates to a digitally expanding decoder for a pulse code modulation system of communication.

The invention provides a decoder for a system in which samples of signal waves to be conveyed over the system are represented by code combinations of digit pulses wherein a part of the code combination indicates in a simple binary code the position of the coded level within a group of levels, the remainder of the code combination indicating the group of a number of groups of levels, having a constant amplitude range within which the coded level lies, the decoder including means for generating at a fixed time prior to the arrival of the first mentioned part of the code combination a wave having a fixed initial amplitude and decaying by a predetermined constant amplitude ratio, means for decoding the first mentioned part of the code combination, means for altering the amplitude of the wave by an amount indicated by the decoded first part of the code combination, means for altering the rate of decay of the wave by amounts indicated by the remainder of the code combination and means for sampling the wave at a fixed time after the rate of decay is altered.

In one embodiment of the invention the generated wave is stored on an integrating condenser with a long discharge time constant compared with the duration of the code combination and the first part of the code combination is decoded to provide pulses proportional in amplitude to the weights of the code pulses present in that part of the code combination, the amplitude pulses being of the same polarity as the stored wave and added thereto to increase the total charge on the integrating condenser.

The pulses making up the remainder of the code combination can be converted into pulses having widths corresponding to their weight and are then used to close a switch allowing the integrating condenser to discharge at a faster rate through a resistor.

In a P.C.M. system using a simple binary code, 10 binary digits are required to represent a total of 1024 amplitude levels. In a digitally companding arrangement, the original 10 digits are replaced by a total of 6 digits in the following manner. It can be shown that sufficient accuracy in speech representation is provided by representing each quantized level by the four most significant digits of the 10-digit code starting with the first binary "1." Thus, a level which would normally be represented by the binary code 0011010110 (reading from left to right in order of significance) can be satisfactorily expressed by the digits 1101 which are the four most significant digits referred to above. In fact, such a compression provides a convenient non-linear companding scheme.

In the case of such four significant digits, the most significant digit thereof can have any one of 7 positions in the 10-digit code. This position can be represented by a simple 3-digit binary code. The most significant digit must always be a "1" and, therefore, need not be sent. It is automatically replaced in the decoder. The next three most significant digits are transmitted unchanged.

Thus, in the example given above, level 0011010110 now becomes 011101, in which the first three digits 011 are the binary equivalent of 3 which indicates the position (from the left) of the most significant digit, or the first "1," in the 10-digit code and the last three digits 101 are the next three digits of the 10-digit code following the first "1." In the remainder of this specification the first group of three digits will be referred to as being the "octave number." The octave number may give the position of the most significant digit, as above, or it may give the position of the four most significant digits of the 10-digit code (i.e. the least most significant of the four most significant digits). Also it may be transmitted before or after the other half of the 6-digit code, and the three digits of the octave number may be transmitted with the digit of least significance first.

The remaining three digits, which are the 2nd, 3rd and 4th most significant digits of the 10-digit code, are referred to as the "octave position."

An embodiment of the invention will now be described with reference to the accompanying drawings, in which.

Figure 1:
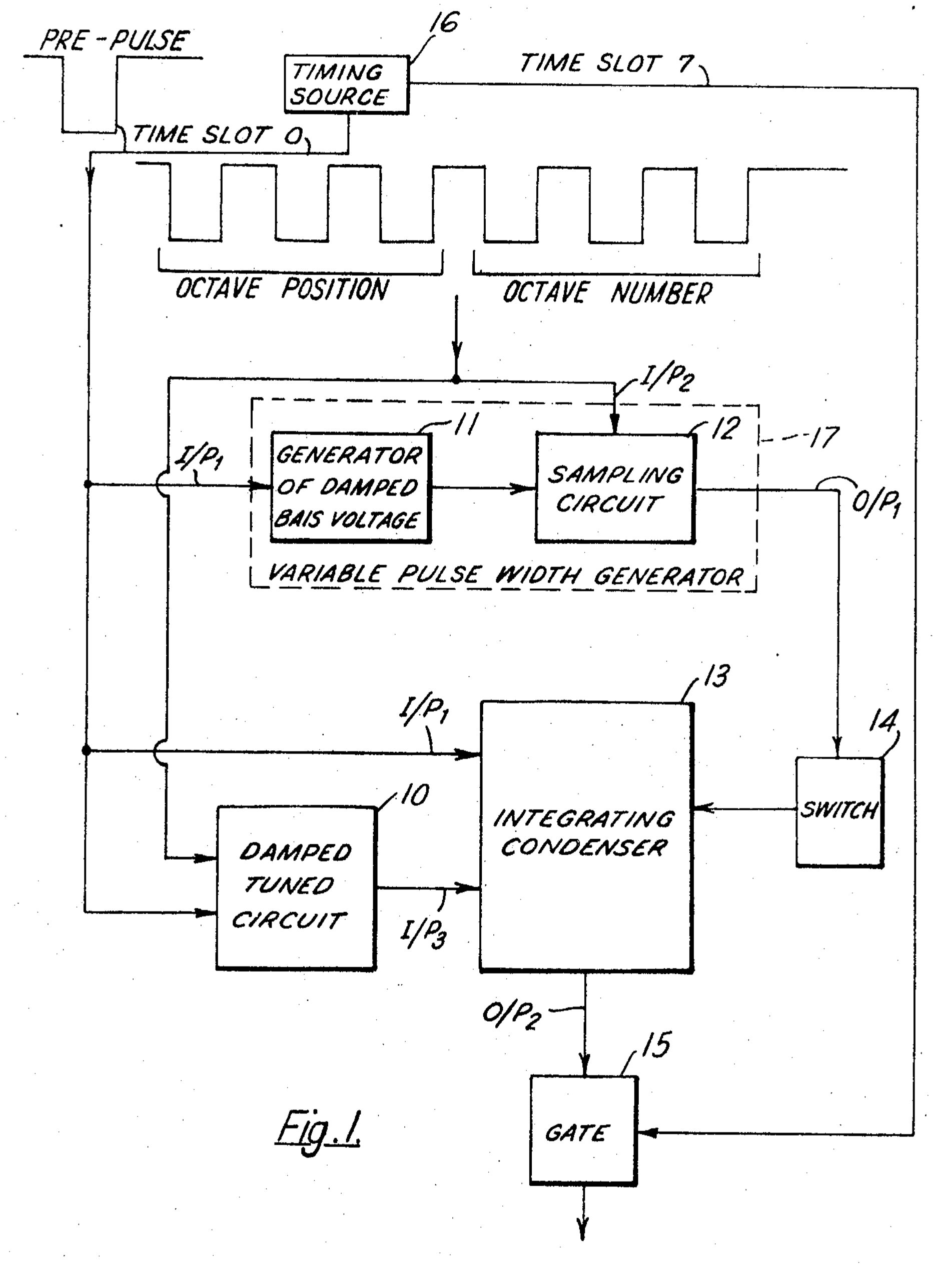
FIG. 1 is a block schematic of a digitally companding decoder.

The decoder to be described is arranged to decode a 6-digit code in which the first three digits are the octave position transmitted in order of significance, with the digit of greatest significance being transmitted first, and the last three digits are the octave number but are transmitted in the opposite order to the first three digits, i.e. with the digit of greatest significance transmitted last.

The incoming code group, which for the purposes of the description is chosen to be 111111, is shown as 6 consecutive negative going pulses "1." The arrival of the code group is precided by a prepulse generated locally by timing source 16. The prepulse is regarded as being present in time slot 0 and the code digits are spaced in time slots 1–6 as determined by the digit time of the received 6-digit code.

The prepulse shock excites a damped tuned circuit 10 to produce a damped oscillation of the same frequency as the digit time scale and descending in amplitude with a ratio of 2:1 per successive positive peak. This damped oscillation has its first positive peak in time slot 1 and is sampled in each of the time slots 1, 2 and 3, if an octave position pulse appears in an appropriate time slot. The output of the circuit 10 in this example is, therefore, three pulses having successively relative amplitudes of 4:2:1. These pulses are shown in wave from 2*c* in FIG. 2 together with the prepulse waveform 2*a* and the code digit waveform 2*b*.

The prepulse is also used to set in operation variable pulses width generator 17 by activating a generator 11 in FIG. 1 which generates a damped bias voltage. This bias voltage is applied to a sampling circuit 12 together with the incoming code pulses. The bias voltage decays in such a manner that only the octave number pulses together with the bias voltage will open a gate the output of which is a series of pulses of constant amplitude and varying in width by the ratio $t$:$2t$:$4t$, respectively. Such pulses are shown in the waveform 2*d* in FIG. 2.

Finally the prepulse is also used to charge an integrating condenser 13. This condenser is arranged to have a normal slow discharge rate, slow that is in comparison with a complete cycle of eight or more time slots. This normal charge on the integrating condenser is shown by the waveform 2*e* on FIG. 2.

Figure 3:
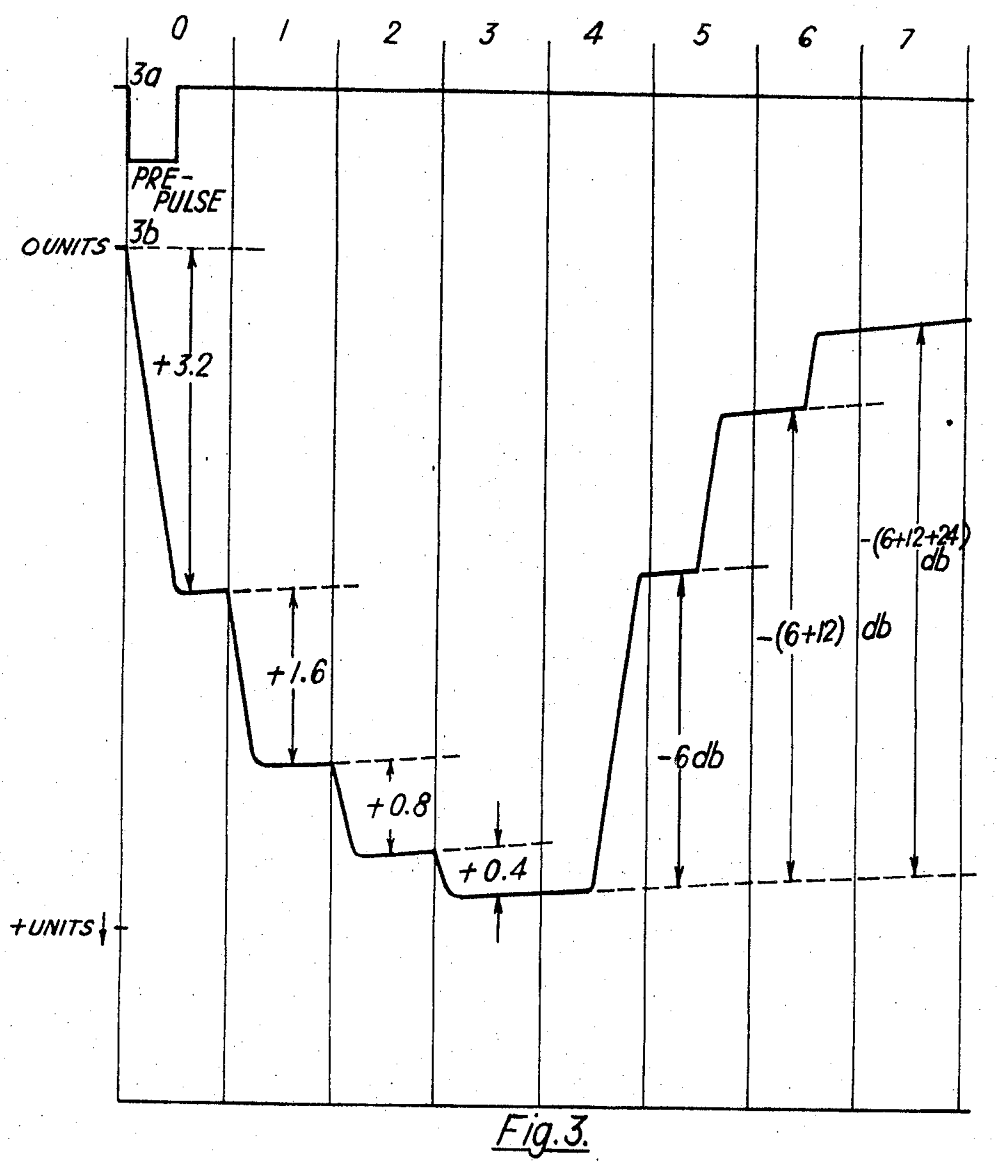
FIG. 3 illustrates the voltage on the integrating condenser during a decoding operation.

The varying amplitude pulses derived from the octave position pulses are also applied to condenser 13. FIG. 3 shows the prepulse waveform 3*a* in time slot 0 and its effect on condenser 13 in time slot 0, waveform 3*b*, namely, an increase in voltage by an amount +3.2 units. In time slot 1, the first and largest amplitude octave position pulse from circuit 10 is applied to condenser 13, thus, increasing the total charge thereon. In time slots 2 and 3, the remaining amplitude pulses from circuit 10 charge condenser 13 still further, so that it reaches a maximum charge at the end of time slot 3. Each increase in charge is half the value of the previous increase. This corresponds to the 2:1 weighting of the octave position pulses. It will be remembered that the most significant digit, the first "1," of the 10-digit code was not transmitted. This digit is replaced in the decoder by the prepulse, which is arranged to charge condenser 13 with twice the charge of the pulse in time slot 1. In FIG. 3, therefore, the waveform 3*b* shows an initial charge of 3.2 units in time slot 0, and further increases of 1.6, 0.8 and 0.4 units in time slots 1, 2 and 3, respectively, making a total of 6 units. Of course if one or more of the octave position pulses were not present in the incoming code then the corresponding increase in condenser 13 charge would be omitted.

Figure 2:
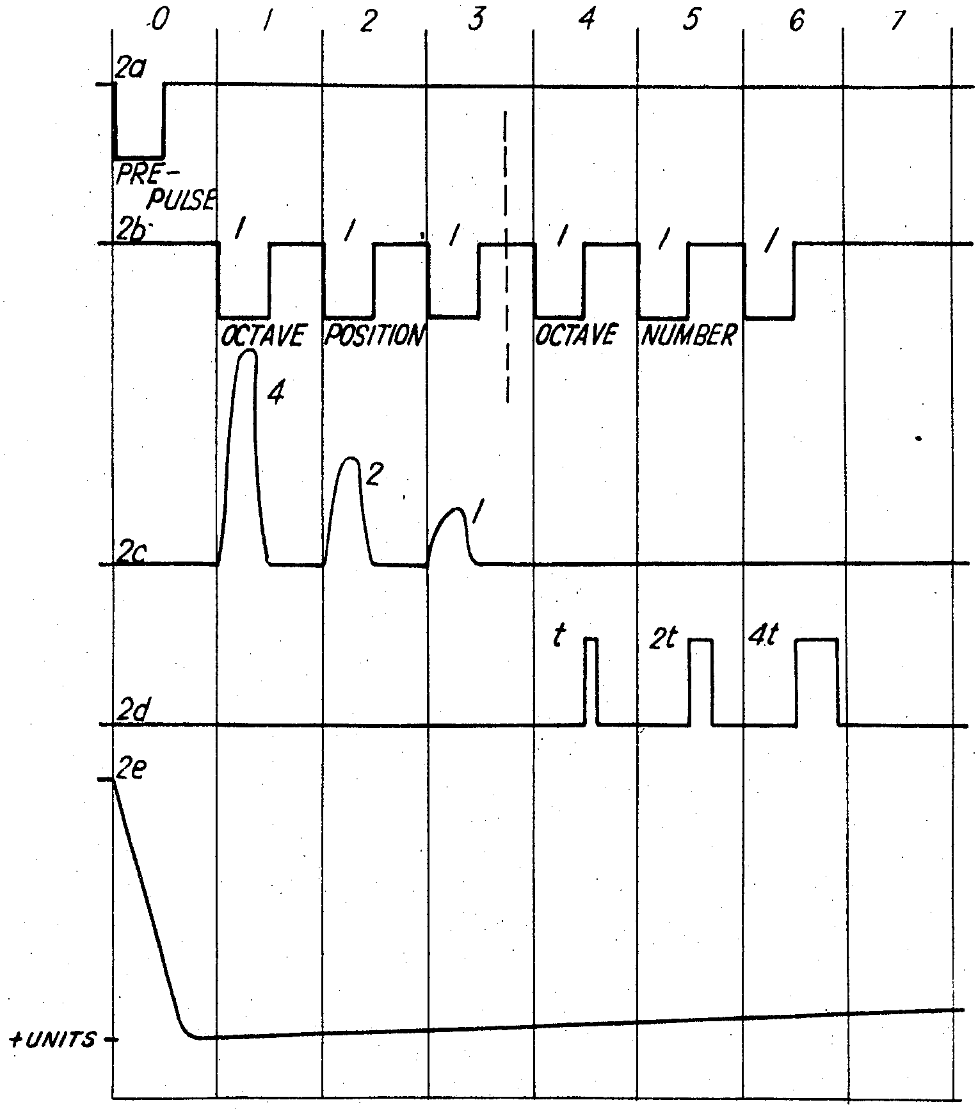
FIG. 2 illustrates certain of the individual waveforms appearing in the decoder.

The octave number pulses, which are now considered as width modulated pulses as shown in wavefrom 2*d* in FIG. 2, are applied to a switch 14 the function of which is to vary the rate of discharge of condenser 13. The pulses are arranged to reduce the total charge on the condenser by 6 db, 12 db and 24 db, respectively. Therefore, if, as in the present example, all three octave number pulses are present the first pulse reduces the charge by 6 db, the second pulses reduces the remaining charge by a further 12 db, and the last pulse reduces the remaining charge by another 24 db. The total charge, therefore, drops by 42 db when all the octave number pulses are present. The result charge on condenser 13 is then sampled by a gate 15 in time slot 7 by an output of timing source 16 in time slot 7 to give an amplitude modulated pulse which represents the original analogue sample amplitude, within the tolerance allowed by the non-linear companding process. It can be shown that where a binary notation is used, with four significant digits, only, the degree of error due to companding cannot exceed 12½%, and will vary between 12½% and 6¼%.

Figure 4:
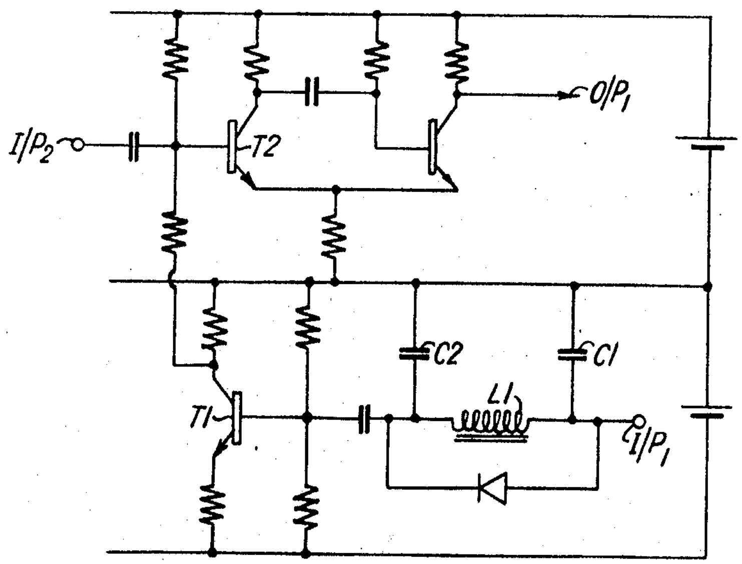
FIG. 4 is a circuit diagram of the variable pulse width generator shown in FIG. 1.

The variable pulse width generator which produces the width modulated octave number generator is shown in FIG. 4. The prepulse is applied to terminal $I/P_1$ and in conjunction with the inductance L1 and the condenser C1 and C2 sets up a bias voltage which is applied via transistor T1 to transistor T2. Transistor T2 is normally biased in the off condition, and this bias is supplemented by the bias voltage from T1. The incoming code pulses are applied to terminal $I/P_2$ and their polarity is such that they oppose the bias voltage applied to T1. The total bias voltage is initially greater than that of the incoming code pulses, but the rate of decay of the voltage generated in the circuit L1, C1, C2 is such that in time slot 4 the bias voltage has decreased to the point that the first octave number pulse can turn T1 on for a short period *t*. In time slot 5, the bias voltage has decayed further and the second octave number pulse can open T1 for a period *t2*, and, in time slot 6, the third pulse can turn T1 on for a period **4*t***. The resultant output at terminal $O/P_1$ is a series of width modulated pulses.

Figure 5:
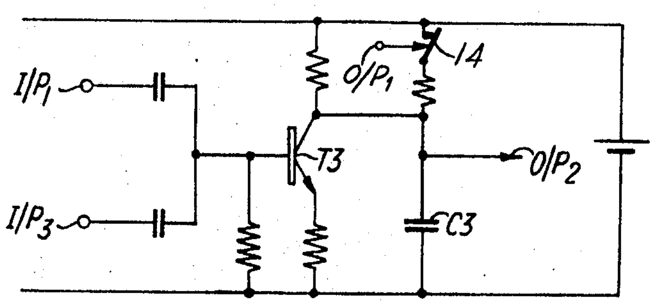
FIG. 5 is a circuit diagram of the integrator and damping gate shown in FIG. 1.

To charge the integrating condenser C3 in FIG. 5, the prepulse is applied to terminal $I/P_1$ and the previously decoded octave position pulses are applied to terminal $I/P_3$. It will be remembered that they are decoded to provide a series of amplitude modulated pulses in time slots 1, 2 and 3 in circuit 10. The pulses applied to $I/P_1$ and $I/P_3$ are fed via transistor T3 to the integrating condenser C3. Switch 14 is maintained open during time slots 0–3, and is closed during time slots 4–6 due to the pulses from generator 17 having periods of *t*, **2*t* and 4*t*, respectively, under the influence of the octave number pulses. The integrating condenser will discharge at a controlled rate during the periods that switch 14 is closed, and the final voltage across condenser C3 at the end of time slot 6 can be sampled at the output $O/P_2$ in time slot 7**.

It is to be understood that the foregoing description of specific examples of this invention is not to be considered as a limitation on its scope.

What we claim is:

1. A decoder for a system in which samples of signals to be conveyed over the system are represented by code combinations of digit pulses having two portions of digit pulses, one portion of digit pulses indicating in a simple weighted binary code the position of the coded level of said sample within a group of coded levels and the other portion of digit pulses indicating in a simple weighted binary code the group of coded levels of a plurality of groups of coded levels, each of said groups of coded levels having a constant amplitude range within which said coded level of said sample lies comprising:

first means for generating at a fixed time prior to the arrival of said one portion of digit pulses a wave having a given fixed amplitude and a predetermined rate of decay;

second means coupled to said first means to decode said one portion of digit pulses and alter said given amplitude of said wave in accordance with the decoded output of said second means;

third means coupled to said first means responsive to said other portion of digit pulses to produce an output determined thereby for altering said predetermined rate of decay; and fourth means coupled to said first means to sample said wave at a fixed time after said predetermined rate of decay is altered.

2. A decoder according to claim 1, wherein said first means includes an integrating condenser having a long discharge time compared with the duration of said code combination to store said wave; and said second means provides first pulses having amplitudes proportional to the weight of the code pulses present in said one portion of digits pulses, said first pulses having the same polarity as said stored wave and are added thereto to increase the total charge on said intergrating condenser.

3. A decoder according claim 2, wherein said third means includes a variable pulse width generation means to produce second pulses having widths proportional to the weight of the code pulses present in said other portion of digit pulses; and said first means includes a resistor coupled to said integrating condenser, a switch coupled in series to said resistor, and fifth means coupled between said pulse width generation means and said switch to control the closed time of said switch by the width of said second pulses to discharge said integrating condenser through said resistor at a rate faster than said predetermined rate of decay for periods corresponding to the width of said second pulses.

References Cited

UNITED STATES PATENTS

| | | | |
|---|---|---|---|
| 2,894,127 | 7/1959 | Stillwell | 328—119 |
| 3,100,889 | 8/1963 | Cannon | 307—231 XR |

ARTHUR GAUSS, Primary Examiner

S. T. KRAWCZEWICZ, Assistant Examiner

U.S. Cl. X.R.

307—227; 328—113, 119, 120, 186